Figure 1:
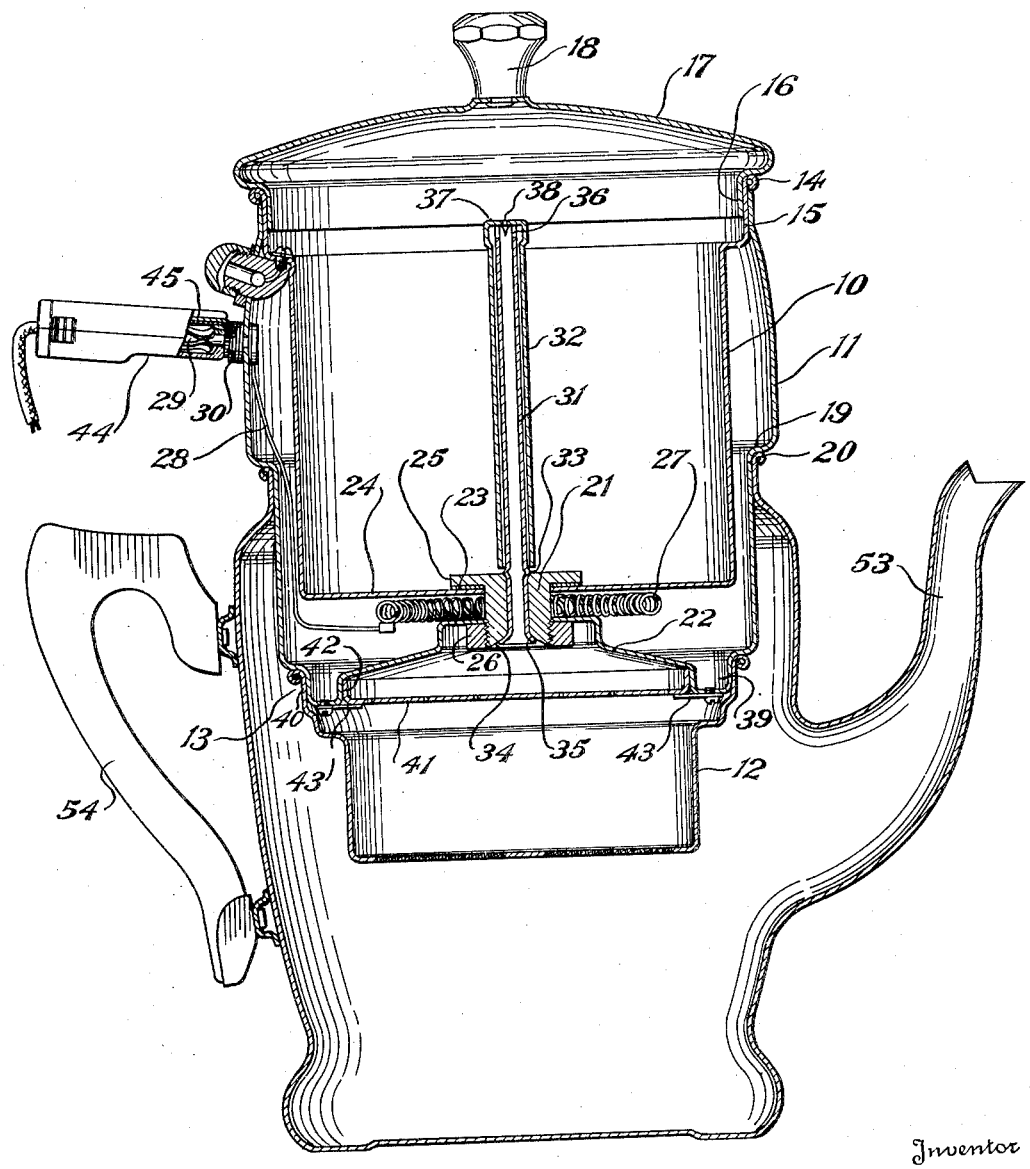

June 12, 1934.   A. C. WILCOX   1,962,165

AUTOMATIC ELECTRIC DRIP COFFEE MAKER

Filed July 20, 1932   2 Sheets-Sheet 1

Inventor

A.C.Wilcox

By Frease and Bishop

Attorneys

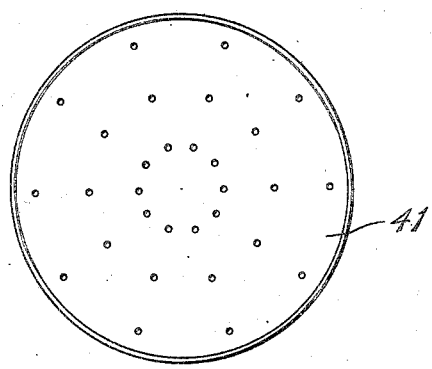

Patented June 12, 1934

1,962,165

UNITED STATES PATENT OFFICE

1,962,165

AUTOMATIC ELECTRIC DRIP COFFEE MAKER

Albert C. Wilcox, Massillon, Ohio, assignor to The Enterprise Aluminum Company, Massillon, Ohio, a corporation of Ohio Application July 20, 1932, Serial No. 623,560

16 Claims. (Cl. 219—44)

The invention relates to coffeepots for making drip coffee and more particularly to an automatically operating electrically heated drip coffee maker.

The object of the improvement is to provide a drip coffee maker comprising generally a cold water unit or reservoir, a coffee basket mounted below the same and a pot for receiving the coffee beverage, heating means being provided for heating the water in the unit or reservoir to the boiling temperature, and a retarded flow siphon being provided for automatically operating by steam pressure in the water reservoir to siphon the boiling water into the coffee basket from which the coffee beverage drips into the pot; means being also provided for shutting off the heating mechanism when the water in the reservoir reaches the boiling point.

A further object is to provide electric heating means for heating the water and means for automatically cutting off said heating means when the water reaches the boiling point and is released through the ground coffee.

Another object of the improvement is to provide an electric switch for the heating means which is automatic in cutting off the current but which requires a manual operation to again turn it on.

A still further object is to provide a detachable spreader plate at the bottom of the water heating unit for distributing the boiling water over the ground coffee in the coffee basket.

The above objects, together with others which will be apparent from an inspection of the drawings and the following detail description, or which will be later pointed out, may be attained by constructing the improved drip coffee maker in the manner illustrated in the accompanying drawings, in which Figure 1 is a vertical sectional view through an automatic electric drip coffee maker embodying the invention;

Fig. 2, an enlarged fragmentary sectional view through a portion of the double shell of the water unit showing the automatic thermal switch partly in section, and the bleeder port for operating the same;

Fig. 3, a top plan view of the thermally controlled electric switch;

Fig. 4, a plan view of the perforated spreader plate;

Fig. 5, a vertical sectional view of the inner tube of the siphon; and

Fig. 6, a similar view of the outer or slip-over tube of the siphon.

Similar numerals refer to similar parts throughout the drawings.

The improved drip coffee maker comprises generally the water container or unit including the inner shell 10 and the outer shell 11 to the lower end of which is detachably connected the coffee basket 12 adapted to be supported within the pot or coffee beverage receptacle indicated generally at 13, in the manner shown in Fig. 1 of the drawings.

A bead 14 may be formed at the upper end of the water container, the inner shell of which may be slightly enlarged as at 15 to receive the depending skirt 16 of the cover 17 which may be of conventional design and adapted to fit reasonably tight upon the water container so as to prevent the escape of steam at the joint. A knob of usual design, as indicated at 18, may be provided for removing and replacing the cover.

As shown in Fig. 1, the inner and outer shells 10 and 11 respectively, of the water container, are spaced apart and the outer shell may be shouldered as at 19 to rest upon the bead 20 at the upper open end of the pot or beverage receptacle 13.

A stud 21 is located through the bottom walls of the inner and outer shells 10 and 11, the latter being preferably slightly convex as shown at 22. A gasket 23 may be located between the bottom wall 24, of the inner shell, and the flange or head 25 upon the top of the stud 21, and a nut 26 is provided upon the lower threaded end of the stud for drawing the stud tight upon the water container and the electric heating element 27 which may be of any suitable type, and which is positioned between the spaced bottom walls of the inner and outer shells of the water container and is connected, as by the lead wires 28 to the terminal posts 29 located through the outer shell 11 and fixed rigidly thereupon as by a lock nut 30.

A delayed action siphon is mounted within the water container and includes the inner or stationary vertical tube 31 and the outer or slip-over tube 32 which loosely fits over the inner tube. The tube 31 is fixed to the stud 21, the lower portion of said tube being shouldered as at 33 to engage the upper end of the stud and the lower end of the tube being extended through the lower end of the stud and swaged over the concaved lower end 34 of the stud as indicated at 35.

The upper end of the inner tube 31 is notched as at 36 and the upper end of the outer or slip-over tube is provided with a cap 37 adapted to rest upon the notched upper end of the inner tube and having the central bleeder port 38 communicating with the interior of the inner tube 31.

The lower portion of the outer shell 11 of the water container is preferably provided with the depending annular rib 39 around the outer side of which the enlarged upper end 40, of the coffee basket 12, is adapted to frictionally fit. The spreader plate, comprising the perforated disk 41, is provided with the upturned skirt 42 adapted to fit within the annular rib 39, fastening members 43 being provided for detachably securing said spreader plate to the underside of the water container.

A switch plug indicated generally at 44 is adapted to be attached to the terminal posts 29 and is provided with a bimetal strip 45 arranged to automatically open the switch when steam impinges thereon, as will be later described.

For this purpose a bleeder valve is located in the water container in suitable position to direct a jet of steam upon the bimetal strip 45 when the water in the container reaches the desired temperature. This bleeder valve is shown generally at 46 and is located through the outer shell 11 of the water container, being connected to the inner shell as by the screw 47 having the central aperture 48 which communicates with the reduced passage 49 in the body of the valve.

An enlarged, ball passage 50 communicates with the outer end of the reduced passage 49, being inclined downward and inward so as to normally hold the check ball 51 therein in position to close the end of the reduced passage 49.

A bleeder port 52 communicates with the outer end portion of the ball passage 50 and is so located as to direct a jet of steam from the bleeder valve upon the bimetal strip 45.

As is customary in drip coffee makers, the pot or coffee beverage receptacle 13 may be provided with a spout 53 and with a diametrically opposite handle 54 of any suitable design whereby the coffee beverage made in the device may be poured from the pot.

In the operation of the improved drip coffee maker, in order to make coffee therein, the proper amount of ground coffee is placed in the coffee basket 12 which is then placed upon the bottom of the outer shell 11, and the proper amount of cold water is placed within the inner shell 10 of the water container, the cover 17 is placed upon the water container and the same is positioned within the pot as shown in Fig. 1.

The switch plug 44 is then placed upon the terminal posts 29 and the switch is manually closed, thus closing the circuit to the heating element 27.

As the temperature rises, the heat is retained in the space between the inner and outer shells 10 and 11, thus expediting the boiling of the water in the container as well as helping to keep the water at boiling temperature after the current has been turned off. As above described, the cover 17 fits tightly upon the water container and a pressure is naturally created inside of the water container when the cover is pressed into position. The bleeder port 38, as well as the bleeder valve, relieves this pressure so that the same is not exerted upon the surface of the water in the container, thereby preventing a siphoning action of the water from starting at this point.

As the temperature of the water rises, pressure is created within the water container, the steam at first passing down through the bleeder port 38 and through the inner tube 31. The ball check valve at first prevents the steam from immediately coming into contact with the bimetal strip 45 on the switch plug.

As the water comes to a boil, the weight of the ball check is overcome and a small jet of steam, from the bleeder port 52, plays on the bimetal strip 45, immediately raising this strip and opening the switch. This switch plug forms the subject matter of another application for United States patent and for that reason it is not thought necessary to illustrate or describe the details thereof.

The heat now radiating from the heating element and the heat confined in the space between the inner and outer shells of the water container causes the water to continue to boil vigorously. This boiling raises the pressure within the water container so that the bleeder port 38 and bleeder valve are unable to relieve the pressure above the surface of the water.

The surplus pressure is thus exerted upon the body of the water in the container, causing the water to flow upward between the inner and outer tubes 31 and 32, and overflow through the notches 36 into the inner tube 31, the water then striking the spreader plate and being diffused over its surface and finding its way through the perforations therein so that it drips over the coffee in the basket 12, the finished coffee beverage dropping through the perforated bottom of said basket into the pot or coffee beverage receptacle 13.

Once this siphoning action is started, the same will continue until all of the water has been siphoned from the water container and passed through the coffee basket to the pot 13.

The escaping steam through the port 38 into the interior of the inner tube 31 helps to continue the flow of water by a partial vacuum pull and also helps to maintain the water at a high temperature.

I claim:

1. A drip coffee maker including a water container, a coffee basket beneath said water container, means for heating water in the water container, means operated by steam produced by the boiling of the water for automatically cutting out said heating means when the water reaches the boiling temperature, and means operated by the boiling of the water for discharging the water from the water container through the coffee basket.

2. A drip coffee maker including a water container, a coffee basket beneath said water container, means for heating water in the water container, means operated by steam produced by the boiling of the water for automatically cutting out said heating means when the water reaches the boiling temperature, means for preventing the water from escaping from the water container before the water reaches the boiling point, and means operated by the boiling of the water for discharging the water from the water container through the coffee basket.

3. A drip coffee maker including a water container, a coffee basket beneath said water container, an electric heating element for heating the water in the water container, a thermally operated switch operated by steam produced by the boiling of the water for cutting out said heating element when the water reaches the boiling temperature, and means operated by the boiling of the water for discharging the water from the water container through the coffee basket.

4. A drip coffee maker including a water container, a coffee basket beneath said water container, an electric heating element for heating the water in the water container, a thermally operated switch operated by steam produced by the boiling of the water for cutting out said heating element when the water reaches the boiling temperature, means for preventing the water from escaping from the water container before the water reaches the boiling point, and means operated by the boiling of the water for discharging the water from the water container through the coffee basket.

5. A drip coffee maker including a water container, a coffee basket beneath said water container, means for heating water in the water container, an upright tube located in the water container and having its lower end extended through the bottom of the water container, and a slip-over tube loosely mounted upon the first named tube and having a cap at its upper end.

6. A drip coffee maker including a water container, a coffee basket beneath said water container, means for heating water in the water container, an upright tube located in the water container and having its lower end extended through the bottom of the water container, and a slip-over tube loosely mounted upon the first named tube and having a cap at its upper end, there being a bleeder port in said cap.

7. A drip coffee maker including a water container, a coffee basket beneath said water container, means for heating water in the water container, an upright tube located in the water container and having its lower end extended through the bottom of the water container, the upper end of said tube being notched, and a slip-over tube loosely mounted upon the first named tube and having a cap at its upper end.

8. A drip coffee maker including a water container, a coffee basket beneath said water container, means for heating water in the water container, an upright tube located in the water container and having its lower end extended through the bottom of the water container, the upper end of said tube being notched, and a slip-over tube loosely mounted upon the first named tube and having a cap at its upper end, there being a bleeder port in said cap.

9. A drip coffee maker including a water container, a coffee basket beneath said water container, an electric heating element for heating the water in the water container, a switch plug electrically connected to the heating element, a bimetal strip for opening said switch and a bleeder port upon the water container for directing a jet of steam upon said bimetal strip when the water in the container reaches the boiling point.

10. A drip coffee maker including a water container, a coffee basket beneath said water container, an electric heating element for heating the water in the water container, a switch plug electrically connected to the heating element, a bimetal strip for opening said switch, a bleeder port upon the water container for directing a jet of steam upon said bimetal strip when the water in the container reaches the boiling point, and a check valve normally closing said bleeder port.

11. A drip coffee maker including a water container formed of two spaced shells, an electric heating element located between said shells, a coffee basket beneath said water container, and means operated by the boiling of the water for discharging the water from the water container through the coffee basket.

12. A drip coffee maker including a water container formed of two spaced shells, an electric heating element located between said shells, means for automatically cutting out said heating element when the water reaches the boiling temperature, a coffee basket beneath said water container, and means operated by the boiling of the water for discharging the water from the water container through the coffee basket.

13. A drip coffee maker including a water container, a coffee basket beneath said water container, means for heating water in the water container, an upright tube located in the water container and having its lower end extended through the bottom of the water container, a perforated spreader plate located below said tube, and a slip-over tube loosely mounted upon the first named tube and having a cap at its upper end.

14. A drip coffee maker including a water container, a coffee basket beneath said water container, means for heating water in the water container, an upright tube located in the water container and having its lower end extended through the bottom of the water container, a perforated spreader plate located below said tube, and a slip-over tube loosely mounted upon the first named tube and having a cap at its upper end, there being a bleeder port in said cap.

15. A drip coffee maker including a water receptacle, a heating element compartment shell below the water receptacle, a stand tube within the water receptacle, a hollow plug surrounding the lower end of the stand tube and located through the bottom of the water receptacle and the heating element compartment shell, a shoulder at the upper end of the plug contacting with the bottom of the water receptacle, a nut upon the lower end of the plug contacting with the bottom of the heating element compartment shell, and a heating element surrounding the plug between the bottom of the water receptacle and the heating element compartment shell.

16. A drip coffee maker including a water receptacle, a heating element compartment shell below the water receptacle and having a recess in its bottom, a stand tube within the water receptacle, a hollow plug surrounding the lower end of the stand tube and located through the bottom of the water receptacle and the heating element compartment shell, a shoulder at the upper end of the plug contacting with the bottom of the water receptacle, a nut upon the lower end of the plug located within said recess, and a heating element surrounding the plug between the bottom of the water receptacle and the heating element compartment shell.

ALBERT C. WILCOX.